Jan. 3, 1939. A. H. FREEMAN ET AL 2,142,267
HOLDER FOR SPRING EYELETS
Filed April 12, 1937

INVENTORS:
Arthur H. Freeman
Joseph S. Fladebo
BY David E. Carlsen
ATTORNEY.

Patented Jan. 3, 1939

2,142,267

UNITED STATES PATENT OFFICE 2,142,267

HOLDER FOR SPRING EYELETS

Arthur H. Freeman and Joseph S. Fladebo, Isle, Minn.

Application April 12, 1937, Serial No. 136,347

1 Claim. (Cl. 43—28)

Our invention relates to holding devices for spring wire eyelets used for various purposes but particularly in fishing tackle, for example eyelets in a fishline and on which a fish hook is attached, a leader connection or the connection of a spoon hook to such a leader and other instances too numerous to be specified.

The main object is to provide a simple, highly efficient and inexpensive construction of eyelets of the class described and providing means for locking said eyelet closed quickly and efficiently to prevent loss of any article retained by the eyelet. The use of our eyelet closing means positively prevents any such losses and accompanying inconvenience.

Our device pertains to that type of tackle having one or two eyelets, integrally formed at one or both ends of a spring wire and in which said eyelet is an integral part of the wire and from one side of the eyelet the wire extends normally in an angular plane as an arm or shank adapted to be sprung down upon and parallel to the main wire. For purpose of illustration of the usefulness of our device we have shown it as used on fishing tackle although it will be obvious that the principle is applicable to other uses wherever link means of this nature is useful in a line, cord or cable etc.

Figure 1:
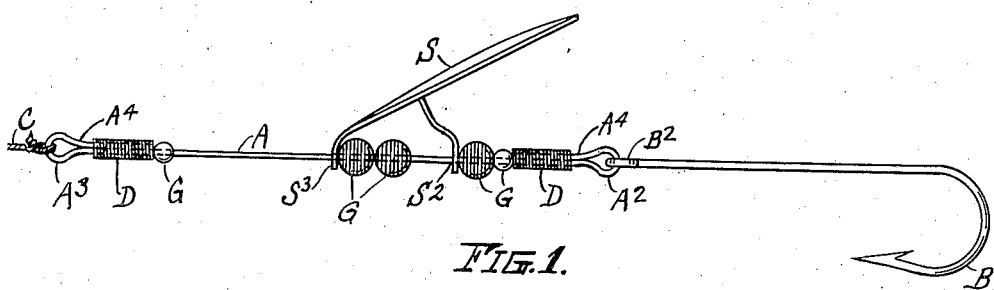
Fig. 1 is a side elevation of a fish lure of the so-called spoon-hook variety and a standard fish-hook attached to the rear eyelet of the spoon hook, our device applying to both the front and rear eyelets.

Referring to the drawing by reference characters, like characters designating corresponding parts in the various views; A is a flexible spring metal wire representing any tackle means on which a regular fish hook B is connected at one end and a snell, or line C attachable to its other end. The wire itself may be a part of a fish lure of the so-called spoon type comprising a metal spoon S retained pivotally and slidably on the wire as at S2 and S3, the spoon being in angular position relative to the wire and capable of rotation when drawn through water. The hook B, for live or other bait, extends rearwardly of the spoon part, is removably connected with its eye B2 to the rear loop or eye A2 of the wire. A3 is a corresponding loop at the front end of the wire, and said loops have each a shank or arm extension A4 normally sprung outwardly angularly from the main wire A and in common plane therewith, the loop at such time being open enough for placing a hook B, or other tackle member, on eye A2 (see Fig. 2).

Hitherto the shank A4 has been retained parallel to main wire A by suitable sleeve means including a coil spring on the latter wire and it is these parts of a fish lure particularly which we have improved.

In our device the sleeve D is a close coiled spring wire sleeve slidable freely on wire A, the outer face parts of each shank A4 is serrated as indicated at E throughout its whole length from eye A2 or A3. These serrations are spaced apart to correspond to the pitch of the coils in the spring sleeve D. Thus when shank A4 is pressed down upon and parallel to wire A (see arrow F Fig. 2) the spring is pushed toward the eye over the two wire parts thus held closely together and as far as it will go.

The outward springing tendency of the shank causes the serrations to engage in and between the coils of the spring sleeve and the immediate result is that the sleeve will not slip or slide off under all the usual and even unusual strains to which fish lure or tackle of this kind is subject.

To disengage the spring coil sleeve the operator merely engages the outer end of the sleeve as between two fingernails and bears forcibly toward the end of the shank A4 (away from the eyelet) simultaneously squeezing the eyelet parts which enter into the sleeve. It has been found from extensive experiments that this holding device is exceptionally strong and prevents loss of fishhooks or any other tackle properly placed on the end eyelet or loop.

In Fig. 1 G designates a number of beads, suitably colored, on the wire A and slidable freely thereon and reducing friction to rotation of the spoon member.

Our improvement is of course not limited to fishing tackle and fish line connections, but may be used wherever a sure hold connection or link may be required on a wire line, cord line or the like.

It will be readily understood that the accompanying drawing is in considerably enlarged scale being approximately double scale of a desirable size of the device.

Figure 2:
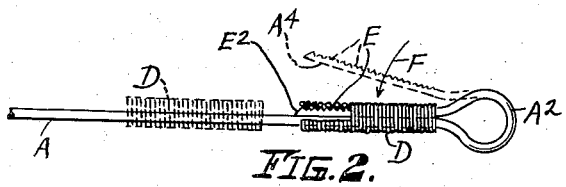
Fig. 2 is an enlarged side view of a single spring wire eyelet and our improved eyelet locking means.
Figure 3:
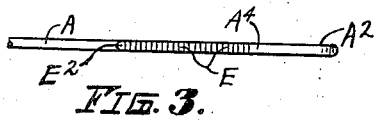
Fig. 3 is a top view of Fig. 2 omitting the coil spring.

In Fig. 2 a portion of the coils of the spring sleeve D (at its inner end part) is cut out to more clearly reveal the manner in which the interior parts of the coils yieldably and frictionally engage the serrations E. Modifications may be embodied in the making of this device, for example the outer parts of wire A may also be serrated. The free end of shank A4 may be beveled as at E2 to start the spring sleeve more easily to its locking position.

We claim:

A fish line link device comprising a spring wire formed at its ends with a loop and a loop shank extending from the loop over the wire in normally angular position to leave an inward opening therebetween, said shank being adapted to be pressed down toward the wire and parallel thereto, to close said opening, a close coiled spring wire sleeve of a size to inclose and be positioned on said parallel parts slidably, said shank being serrated in its outer surface for slidable, removable, and frictional engagement with the inner areas of the coils of said sleeve.

ARTHUR H. FREEMAN.
JOSEPH S. FLADEBO.